(12) United States Patent
Unger et al.

(10) Patent No.: US 9,081,833 B1
(45) Date of Patent: Jul. 14, 2015

(54) PROVIDING A TOOLTIP BASED ON SEARCH RESULTS

(71) Applicant: Google Inc., Mountain View, CA (US)

(72) Inventors: Alexander Ketner Unger, San Francisco, CA (US); Yo Eun Ko, Belmont, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/857,107

(22) Filed: Apr. 4, 2013

Related U.S. Application Data

(60) Provisional application No. 61/621,415, filed on Apr. 6, 2012.

(51) Int. Cl.
*G06F 3/00* (2006.01)
*G06F 17/30* (2006.01)

(52) U.S. Cl.
CPC .............................. *G06F 17/30554* (2013.01)

(58) Field of Classification Search
None
See application file for complete search history.

(56) References Cited

U.S. PATENT DOCUMENTS

| | | | |
|---|---|---|---|
| 8,234,346 B2* | 7/2012 | Rao et al. ...................... | 709/207 |
| 8,832,138 B2* | 9/2014 | Nurminen et al. ............ | 707/769 |
| 2005/0144387 A1* | 6/2005 | Adl-Tabatabai et al. ..... | 711/118 |
| 2005/0283497 A1* | 12/2005 | Nurminen et al. ......... | 707/104.1 |
| 2011/0267980 A1* | 11/2011 | Calippe et al. ................ | 370/254 |
| 2011/0314415 A1* | 12/2011 | Fitzmaurice et al. ......... | 715/808 |
| 2012/0095997 A1* | 4/2012 | Nice et al. ..................... | 707/728 |
| 2012/0290974 A1* | 11/2012 | Doig et al. .................... | 715/808 |
| 2013/0019174 A1* | 1/2013 | Gil et al. ....................... | 715/711 |

* cited by examiner

*Primary Examiner* — Hung Le
(74) *Attorney, Agent, or Firm* — McDermott Will & Emery LLP

(57) ABSTRACT

Systems and methods for providing a tooltip based on search results within a social network are provided. A method includes receiving a search query within the social network. The method also includes determining a set of search results responsive to the search query. The set of search results is from within the social network. The set of search results includes search results of a first type and search results of a second type. The method also includes providing for display of plural ones of the search results of the first type. The method also includes determining whether a number of search result of the second type exceeds a threshold number. The method also includes, providing, in a case where the number of search results of the second type exceeds the threshold number, for display of a tooltip. The tooltip indicates the second type.

20 Claims, 7 Drawing Sheets

PROVIDING A TOOLTIP BASED ON SEARCH RESULTS

CROSS-REFERENCE TO RELATED APPLICATIONS

The present application claims the benefit of priority under 35 U.S.C. §119 from U.S. Provisional Patent Application Ser. No. 61/621,415 entitled "PROVIDING A TOOLTIP BASED ON SEARCH RESULTS," filed on Apr. 6, 2012, the disclosure of which is hereby incorporated by reference in its entirety for all purposes.

BACKGROUND

The subject technology generally relates to user interfaces for Internet or database search and, in particular, relates to providing a tooltip based on search results.

Text-based information, for example, posts within a social network, are searchable and can be produced in response to a search query entered within the social network. As a result, a user of the social network may enter a search query and obtain posts within the social network related to the query. However, the social network may include content other than posts, for example, profiles of members, webpages including multiple posts, or discussion rooms. In a set of search results produced responsive to a search query within the social network, such content may not be displayed at all or may be displayed deep within the set of search results or close to the bottom of a webpage listing search results.

SUMMARY

In one innovative aspect, the disclosed subject matter can be embodied in a method that includes receiving a search query within a social network. The method also includes determining a set of search results responsive to the search query. The set of search results is from within the social network. The set of search results includes search results of a first type and search results of a second type. The method also include providing for display of plural ones of the search results of the first type. The method also includes determining whether a number of search result of the second type exceeds a threshold number. The method also includes providing, in a case where the number of search results of the second type exceeds the threshold number, for display of a tooltip. The tooltip indicates the second type.

These and other embodiments can include one or more of the following features. The method also includes refraining from providing, in a case where the number of search results of the second type does not exceed the threshold number, for display of the tooltip. The first type includes generic search results, and the second type includes a sub-type of the first type. The first type includes search results of a sub-type, and the second type includes generic search results not having the sub-type. The method also includes receiving a request for the search results of the sub-type in conjunction with the search query. The tooltip includes a set of images. Each image within the set of images is associated with a corresponding search result of the second type. The set of images includes at least the threshold number of images. The method also includes determining the threshold number based on the size of the tooltip. The first type includes posts within the social network. The second type includes a profile of an individual member of the social network. The second type includes a webpage within the social network including a plurality of posts. The second type includes a discussion room within the social network. The method also includes receiving a selection of the tooltip. The method also includes providing for display of a first number of search results of the second type responsive to the selection of the tooltip, wherein the first number exceeds the threshold number.

In one innovative aspect, the disclosed subject matter can be embodied in a non-transitory computer-readable medium that includes instructions that can be executed by one or more computers. The instructions include code for receiving a search query within a social network. The instructions also include code for determining a set of search results responsive to the search query. The set of search results is from within the social network. The set of search results includes generic search results and non-generic search results. The instructions also include code for determining that a number of non-generic search results of a specified type exceeds a threshold number. The instructions also include code for providing for display of a tooltip. The tooltip indicates the specified type. The tooltip includes a set of images.

These and other embodiments can include one or more of the following features. The instructions also include code for providing for display of plural ones of the generic search results. Each image within the set of images is associated with a corresponding non-generic search result having the specified type. The set of images includes at least the threshold number of images. The instructions also include code for determining the threshold number based on the size of the tooltip. The generic search results are posts within the social network.

In one innovative aspect, the disclosed subject matter can be embodied in a system that includes one or more processors. The system also includes a memory including instructions which, may be executed by the one or more processors. The instructions include code for receiving a search query within a social network. The instructions also include code for determining a set of search results responsive to the search query. The set of search results is from within the social network. The set of search results includes generic search results and non-generic search results. The instructions also include code for providing for display of plural ones of the generic search results. The instructions also include code for determining that a number of non-generic search results of a specified type exceeds a threshold number. The instructions also include code for providing for display of a tooltip. The tooltip indicates the specified type.

These and other embodiments can include one or more of the following features. The specified type includes a profile of an individual member of the social network or a webpage within the social network comprising a plurality of posts. The specified type includes a text, audio, or video discussion room within the social network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
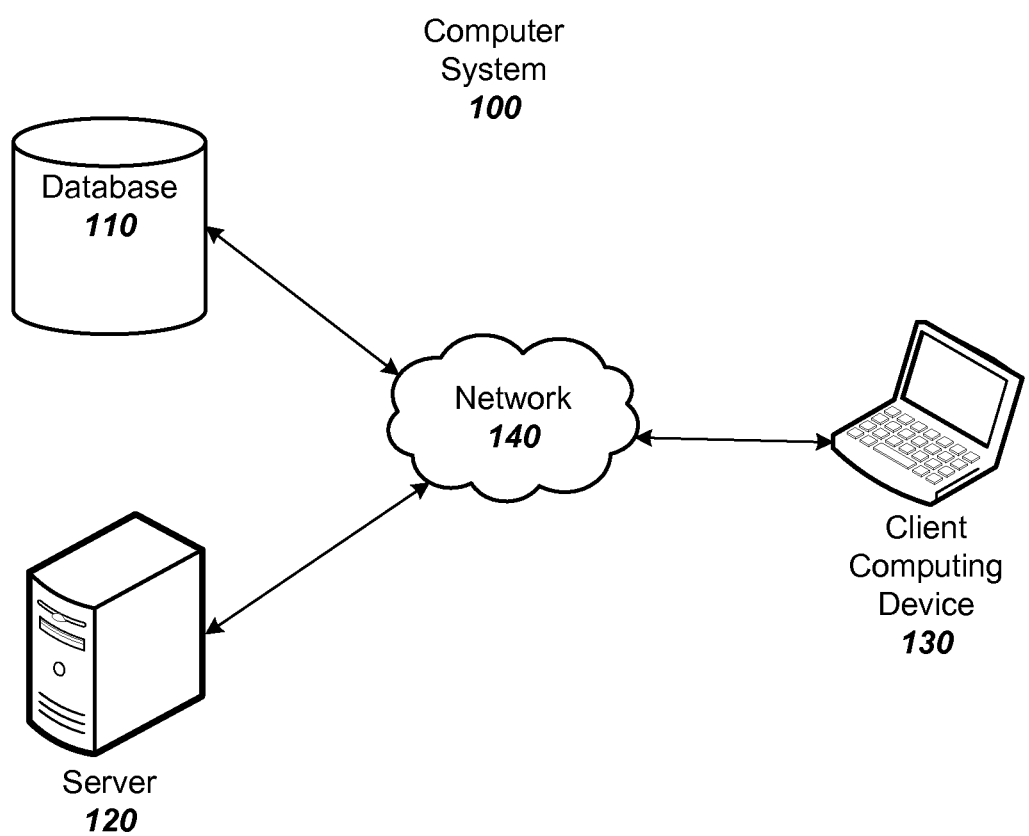
FIG. 1 illustrates an example of a computer system configured to provide a tooltip based on search results.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, some structures and components are shown in block diagram form in order to avoid obscuring the concepts of the subject technology.

As noted above, in a set of search results produced responsive to a search query within a social network, content other than posts, for example, profiles of members, webpages including multiple posts, or discussion rooms, may be difficult to discover as such content may not be displayed at all or may be displayed deep within the set of search results or close to the bottom of a webpage listing search results. However, the social network may wish to assist a user in discovering content other than posts related to topics in which the user is interested as such content may engage the user and cause the user to access the social network more frequently. As the foregoing illustrates, an approach to searching within a social network that would encourage a user to interact with content other than posts may be desirable.

The subject technology is related to providing a tooltip based on search results within a social network. In one implementation, a server may receive a search query within the social network. For example, a user may enter a search query via a web browser window on a client computing device, and the query may be transmitted to the server. The server may determine a set of search results responsive to the search query. The set of search results may be from within the social network. The set of search results may include search results of a first type (e.g., posts within the social networks) and search results of a second type (e.g., one or more of profiles within the social network, multi-post webpages within the social network, or discussion rooms within the social network). The server may provide for display of plural ones of the search results of the first type. The search results of the first type may be displayed within the web browser window on the client computing device. The server may determine whether a number of search result of the second type exceeds a threshold number (e.g., three). The server may provide, in a case where the number of search results of the second type exceeds the threshold number, for display of a tooltip, wherein the tooltip indicates the second type. The tooltip may be displayed within a web browser window or within an application window, for example, in a mobile phone or tablet computer application. The tooltip may be displayed adjacent to a control button for setting the web browser window to display search results of the second type. The tooltip may include and indication of the second type and a set of images. Each image in the set of images may be associated with a corresponding search result of the second type. In a case where the number of search results of the second type does not exceed the second number, the server may refrain from providing for display of the tooltip.

Advantageously, in some implementations of the subject technology, a user is informed of content other than posts (e.g., profiles of members, multi-post webpages, or discussion rooms) within the social network that is related to a search query entered by the user. As a result, the user may become more engaged with the social network and more knowledgeable of the features of the social network.

FIG. 1 illustrates an example of a computer system 100 configured to display a suggested query completion within a web browser window. As shown, the computer system 100 includes a database 110, a server 120, and a client computing device 130. The database 110, server 120, and client computing device 130 may be configured to communicate with one another via a network 140. The network 140 may include the Internet, an intranet, a local area network, a wide area network, a wired network, a wireless network, or a virtual private network (VPN).

The database 110 may store data (e.g., posts, profiles, multi-post webpages, discussion rooms, etc., which may include text, images, videos, audio files, etc.) related to a social network, an index for searching within the social network, or any other information. The database may include a single machine, multiple machines, a single processor system, or a multi-processor system. One example of the database 110 is described in more detail in conjunction with FIG. 2 below.

The server 120 may include a module to search data within the social network, which may be stored within the database 110 or other sources. The server 120 may be implemented as a single machine with a single processor, a multi-processor machine, or as multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display webpages or search webpages. While only one client computing device 130 is illustrated in FIG. 1, the subject technology may be implemented in conjunction with one or more client computing devices 130.

Figure 2:
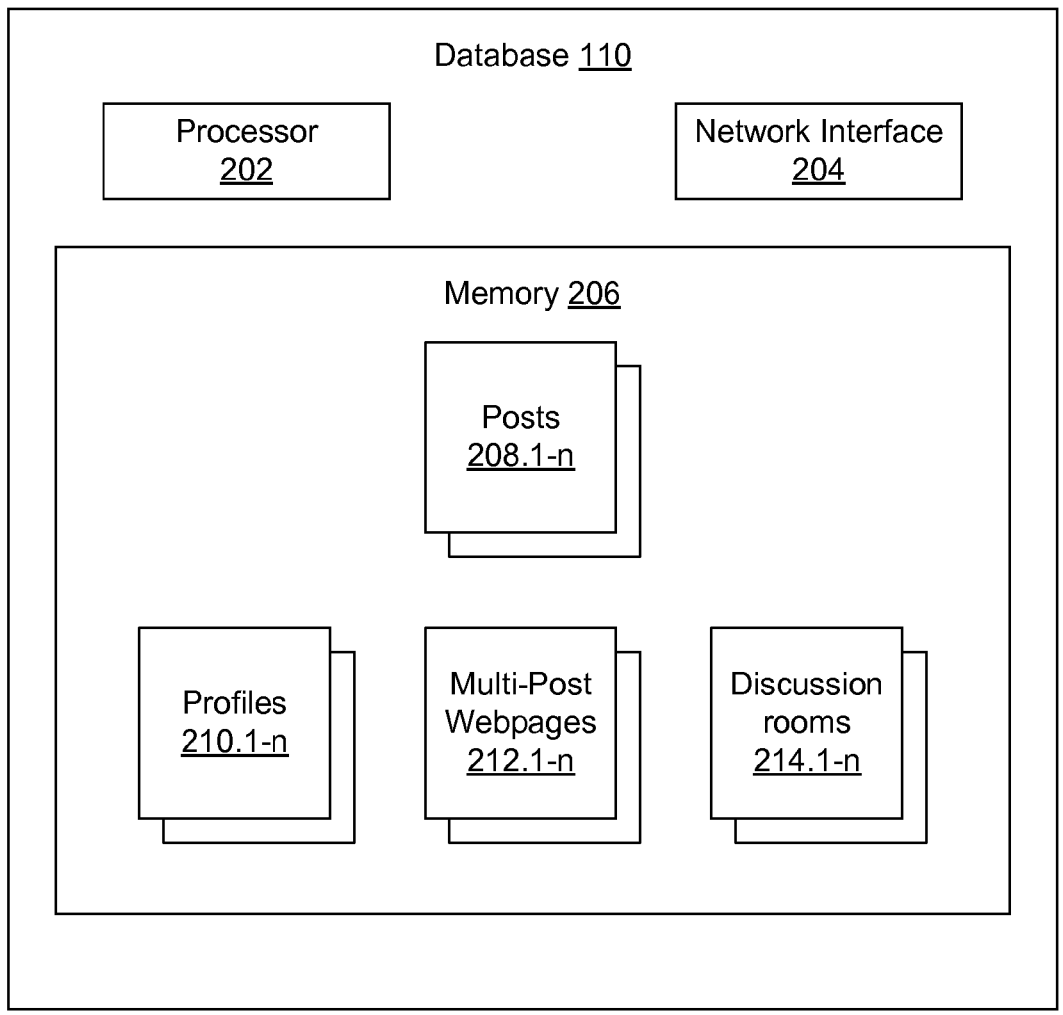
FIG. 2 illustrates an example of the database of FIG. 1 in more detail.

FIG. 2 illustrates an example of the database 110 in more detail.

As shown, the database 110 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the database 110 may include multiple processors. The network interface 204 is configured to allow the database 110 to transmit and receive data in a network, e.g., network 140 of FIG. 1. The network interface 204 may include one or more network interface cards (NICs). The memory 206 may store data or instructions. As illustrated, the memory 206 includes a plurality of posts 208.1-n, profiles 210.1-n, multi-post webpages 212.1-n, and discussion rooms 214.1-n.

The posts 208.1-n may include data posted to the social network by one or more members or users of the social network. The posts 208.1-n may include text posts (e.g., one member may post the text "Happy Holidays" within the social network), images (e.g., a single photograph, an album of photographs or a drawing), video files, or audio files (e.g., a member of a social network may record him/herself speaking). Each post may be added to the social network by one or more members and may be associated with one or more tags indicating the member him/herself, other members, information about the content, geographic information, time information, etc. For example, a first member of the social network, Albert, may take a photograph of himself and Betsy standing under a palm tree in Hawaii and post the photograph to the social network. Albert may add the tags "Albert" and "Betsy" to the photograph. The social network may automatically add the tags "Hawaii" based on the geographic location where the photograph was taken (identified, for example, by a global positioning system unit within the camera) and "palm tree" based on the content of the photograph. However, the member of the social network may opt-out of any tags being automatically added to his/her content or may be required to opt-in in order for such tags to be added.

The profiles 210.1-n may include profiles of users of the social network. The users may include individual members and organizations (e.g., businesses, university alumni, professional organizations, or organizations expressing a viewpoint, e.g., a political or religious viewpoint). Each profile 210.1-n may be associated with an image or photograph of the user or selected by the user, information about the user (e.g., name, default location, current and former employers, current or former educational institutions attended, etc.). Each profile 210.1-n may also include one or more posts related or directed to the user.

The multi-post webpages 212.1-n may include webpages having multiple posts. The webpages and the posts thereon may be related to a common topic (e.g., a type of music, a celebrity, a movie, a political issue, etc.) An example of a multi-post webpage may include a webpage within a social network discussing classic rock music or a webpage within a social network discussing European films of the 1990s.

Each discussion rooms 214.1-n may include a link to a web-based service that allows for real-time messaging between one or more users within the discussion room 214.1-n. Each user may access the discussion room from his/her own client computing device 130. The discussion room 214.1-n may implement one or more of text messaging, audio messaging, or video messaging. Each discussion room 214.1-n may be associate with a topic (e.g., a type of music, a celebrity, a movie, a political issue, etc.). For example, a discussion room 214.1-n may discuss a debate of presidential candidates or tourist destinations in a specific city. As used herein, the term "real-time" refers to one or more computing devices providing an output within a certain time period after receiving an input. The certain time period may be, for example, less than one hour, thirty minutes, five minutes, one minute, ten seconds, or one second depending on the processing speed of the one or more computing devices, the processing speed of the network connection, the size of the input, the size of the output, the size of the data to be processed in generating the output, or other processing considerations.

Figure 3:
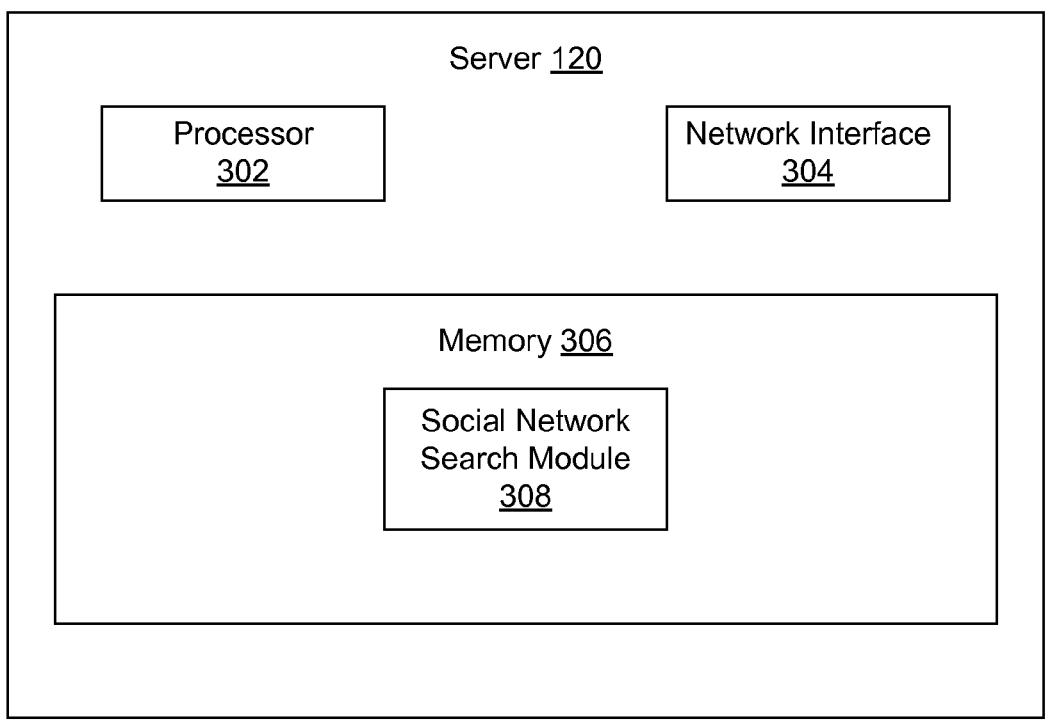
FIG. 3 illustrates an example of the server of FIG. 1 in more detail.

FIG. 3 illustrates an example of the server 120 in more detail.

As shown, the server 120 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 120 may include multiple processors. Furthermore, while the server 120 is illustrated as a single machine, the server 120 may include multiple machines. The network interface 304 is configured to allow the server 120 to transmit and receive data in a network, e.g., network 140 of FIG. 1. The network interface 304 may include one or more network interface cards (NICs). The memory 306 may store data or instructions. As illustrated, the memory 306 includes a social network search module 308.

The social network search module 308 is configured to provide for searching data within a social network based on a query, which may be stored within the database 110. The query may include a text query, an image query, or an audio query. The text query may include text, for example, "African elephant." The image query may include an image, e.g., a photograph. The audio query may include one or more spoken words, which may be recorded, for example, via a microphone on a client computing device 130.

In one example, the social network search module 308 is implemented in software. The social network search module 308 may include code for receiving (e.g., on the server 120) a search query within a social network. The social network search module 308 may also include code for determining a set of search results responsive to the search query. The set of search results may be from within the social network and may be stored in the database 110. The set of search results may include generic search results (e.g., one or more posts 208.1-n within the social network) and non-generic search results (e.g., one or more profiles 210.1-n, one or more multi-post webpages 212.1-n, or one or more discussion rooms 214.1-n within the social network). The social network search module 308 may also include code for providing for display (e.g., via a web browser on the client computing device 130) of plural ones of the generic search results. The social network search module 308 may also include code for determining that a number of non-generic search results of a specified type exceeds a threshold number (e.g., three) of non-generic search results of the specified type. The specified type may include profiles 210.1-n or multi-post webpages 212.1-n. For example, the specified type may include a profile of an individual member of the social network or a webpage within the social network including a plurality of posts. The specified type may include discussion rooms 214.1-n. For example, the specified type may include a text or video discussion room within the social network. The social network search module 308 may also include code for providing for display (e.g., via a web browser on the client computing device 130) of a tooltip.

The tooltip may indicate the specified type and may include a hyperlink for viewing search results of the specified type. For example, if the specified type is profiles 210.1-n or multi-post webpages 212.1-n, the tooltip may include the text "Looking for profiles or multi-post webpages?" within a hyperlink for viewing a list including all or a portion of the profiles 210.1-n or multi-post webpages 212.1-n within the search results. In one example, the words "profiles" or "multi-post webpages" may be replaced with trademarks or service marks of the social network associated with profiles or multi-post webpages.

The tooltip may also include a set of images. Each image within the set of images may be associated with a corresponding non-generic search result having the specified type. The set of images may include at least a number of images equal to the threshold number of non-generic search results of the specified type. The threshold number of search results of the specified type may be determined based on the size of the tooltip. In other words, if the client computing device 130 is a mobile phone, the tooltip may be smaller than if the client computing device 130 is desktop computer with a full-size screen. Thus, for the mobile phone, the threshold number of non-generic search results of the specified type may be smaller than that for the desktop computer. For example, the threshold number of search results of the specified type may be two for the mobile phone and five for the desktop computer.

Figure 4:
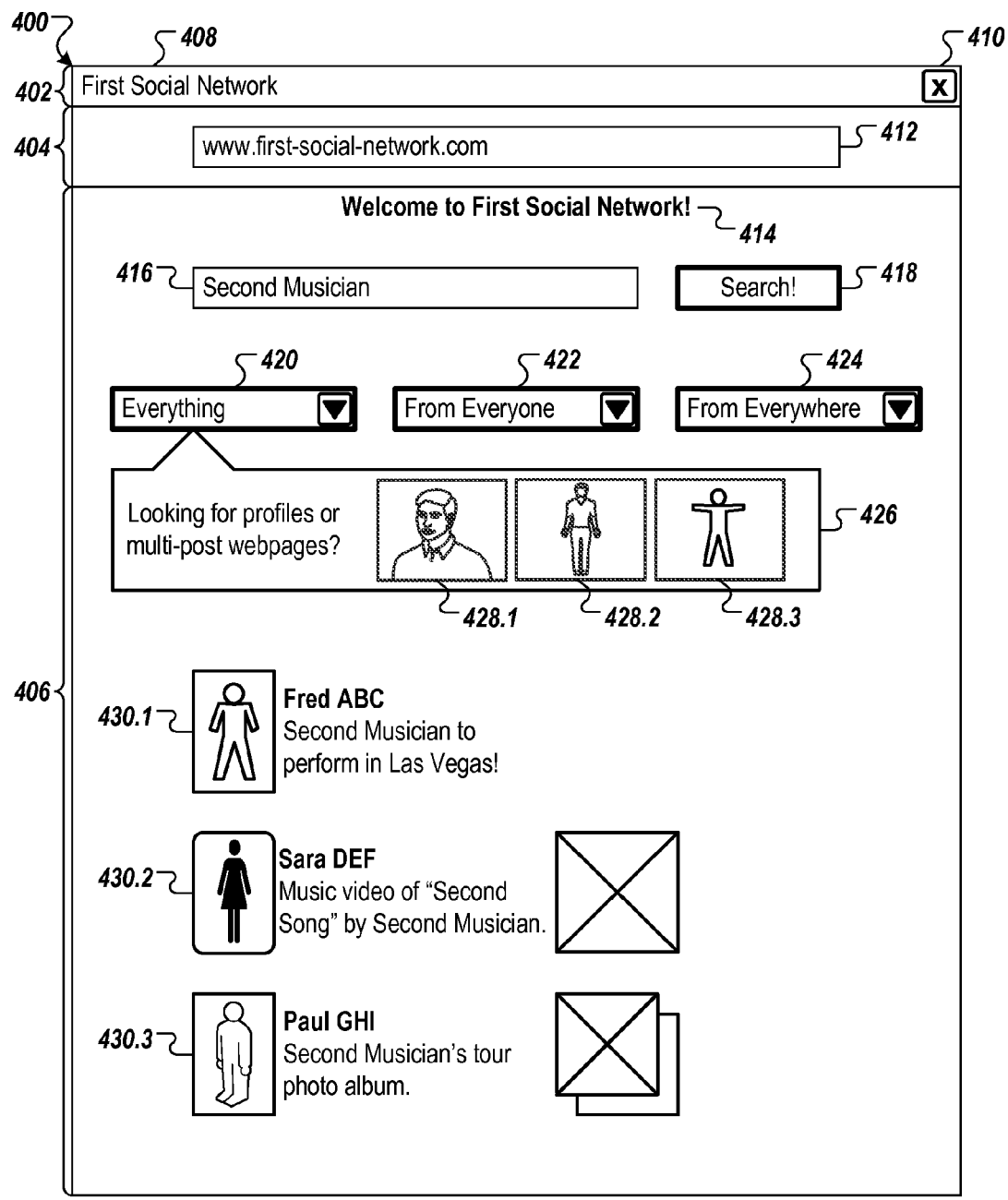
FIG. 4 illustrates an example of a web browser window configured to provide for display of a tooltip based on search results.

FIG. 4 illustrates an example of a web browser window 400 configured to provide for display of a tooltip based on search results.

The web browser window 400 may be displayed via a display (e.g., a screen) of a client computing device (e.g., client computing device 130). As shown, the web browser window 400 includes a header region 402, a control region 404, and a webpage display region 406.

The header region 402 includes a title bar 408 and a close button 410. The title bar 408 indicates the title of a webpage being displayed within the webpage display region 406, for example, "First Social Network." The close button 410, when selected, is configured to cause the web browser window 400 to close.

The control region 404 includes a uniform resource locator (URL) input box 412. The URL input box 412 is configured to receive a user input of a URL of a webpage to be displayed within the webpage display region 406.

The webpage display region 406 is configured to display a webpage, e.g., a webpage associated with a URL entered in the URL input box 412. As shown, the webpage display region 406 displays a webpage associated with a social network. The webpage display region 406 includes a webpage header 414, a search input box 416, a search button 418 a search result type constraint box 420, a search result source constraint box 422, a search result geography constraint box 424, a tooltip 426, images within the tooltip 428.1-3, and generic search results 430.1-3.

The webpage header 414 may display header information about the webpage. For example, the webpage header may display the text, "Welcome to First Social Network!" Alternatively, the webpage header 414 may display a trademark or service mark associated with First Social Network.

The search input box 416 may be configured to allow a user to enter a search query, e.g., a text query, an image query, or an audio query. As shown, the user has entered the text query "Second Musician" in the search input box 416.

The search button 418, when selected, may be configured to cause the web browser window 400 to display search results based on the search query within the search input box 416. The search results may be generated by a server (e.g., server 120). The displayed search results may be filtered based on input from the search result type constraint box 420, the search result source constraint box 422, or the search result geography constraint box 424.

The search result type constraint box 420 may be configured to allow a user to constrain the types of search results that are displayed. For example, the user may select to have all search results displayed ("everything") or to have only one or more of posts, profiles, multi-post webpages, or discussion rooms displayed.

The search result source constraint box 422 may be configured to allow a user to constrain the source of search results that are displayed. As illustrated, the source is not constrained ("from everyone"). However, by selecting and manipulating data in the search result source constraint box 422, the user may select to have only search results posted or uploaded by him/herself displayed. Alternatively, the user may select to have only search results from certain social groups, e.g., the user's social circles displayed.

A user may create "social groups" (e.g., social circles, lists or sets of social networking contacts) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings. A social group may include one or more social circles of a member or contacts having similar personal characteristics (e.g., an age range, a profession, a geographic location, a current or former educational institution attended, a current or former employer, a hobby, or an athletic endeavor) to the member. The personal characteristics may be entered by users of the social networking service upon registration with the social networking service or upon modification of their personal data.

The search result geography constraint box 424 may be configured to allow the user to constrain the geographic source of search results that are displayed. As illustrated, the geographic source is not constrained ("from everywhere"). The geographic source of a search result may be determined based on one or more of a default location of a user who posted or uploaded the search result, a location where the search result was created, or a location from where the search result was posted or uploaded to the social network. For example, a user may constrain his/her search results to results from within the United States, to search results from the State of California, or to search results from within 100 kilometers of Toronto, Ontario. In some implementation, a user posting content to the social network may opt out of having the content associated with a geographic location or the user may not provide his/her own default location. As a result, some of the content in the social network may not be associated with any geographic location.

As illustrated, the tooltip 426 suggests that the user may consider constraining the search to profiles or multi-post webpages. The tooltip 426 is placed adjacent to the search result type constraint box 420 to indicate that the user may use the search result type constraint box 426 to constrain searches in general, e.g., at a future time when the user enters another search query within the social network and the tooltip 426 is not presented. The tooltip may also include images 428.1-3 associated with search results of the specified type (profiles or multi-post webpages) of the tooltip.

The generic search results 430.1-3 may include posts within the social network (e.g., text, a video, or a photo album) each post may include an image associated with the posting member, the name of the posting member, and an indication of the content of the post. The indication of the content of the post may include, for example, the text of the post, a thumbnail of a screen shot of a video, or a thumbnail of one or more images in a photograph album. While three generic search results 430.1-3, the subject technology may be implemented with any number of generic search results.

Figure 5:
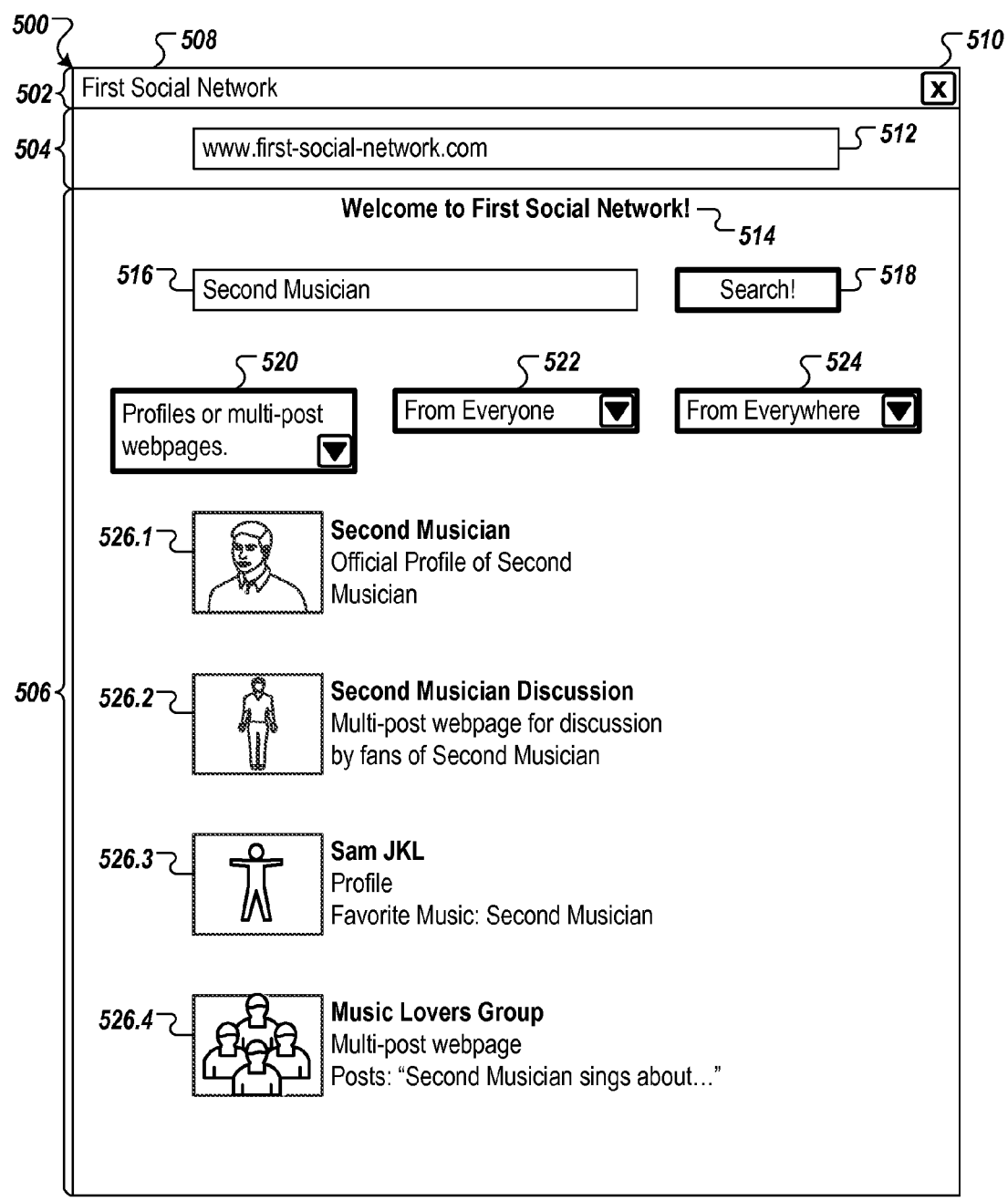
FIG. 5 illustrates an example of a web browser window configured to provide for display of non-generic search results.

FIG. 5 illustrates an example of a web browser window 500 configured to provide for display of non-generic search results. In one implementation, the web browser window 500 may be presented in response to the user selecting (e.g., clicking with a mouse or touching via a touch screen) the tooltip 426 of FIG. 4.

The web browser window may be displayed via a display (e.g., a screen) of a client computing device (e.g., client computing device 130). As shown, the web browser window 500 includes a header region 502, a control region 504, and a webpage display region 506.

The header region 502 includes a title bar 508 and a close button 510. The header region 502 may be similar to the header region 402 of FIG. 4

The control region 504 includes a URL input box 512. The control region 504 may be similar to the control region 404 of FIG. 4.

The webpage display region 506 is configured to display a webpage, e.g., a webpage associated with a URL entered in the URL input box 512. As shown, the webpage display region 506 displays a webpage associated with a social network. The webpage display region 506 includes a webpage header 514, a search input box 516, a search button 518 a search result type constraint box 520, a search result source constraint box 522, a search result geography constraint box 524, and non-generic search results associated with a specified search result type 526.1-4.

The webpage header 514, the search input box 516, the search button 518, the search result source constraint box 522, and the search result geography constraint box 524 may be similar to the webpage header 414, the search input box 416, the search button 418, the search result source constraint box 422, and the search result geography constraint box 424 of FIG. 4.

The search result type constraint box 520 may be similar to the search result type constraint box 420 of FIG. 4. However, as illustrated, in the search result type constraint box 520, the search result type is constrained to the specified search result type "profiles or multi-post webpages." In one example, this selection may be caused by the user selecting the tooltip 426 in the web browser window 400 of FIG. 4. Based on the selection of the specified search result "profiles or multi-post webpages" in the search result type constraint box 520, the displayed search results 526.1-4 may all be associated with the specified search result type "profiles or multi-post webpages." While four search results 526.1-4 associated with the specified search result type are displayed, the subject technology may be implemented with any number of search results associated with the specified search result type.

As illustrated, the search results include profiles 526.1 and 526.3 and multi-post webpages 526.2 and 526.4. Some of the search results 526.1-4 may include an associated image. As illustrated, the image for search results 526.1, 526.2, and 526.3 matches the images 428.1, 428.2, and 428.3, respectively, displayed within the tooltip 426 of FIG. 4. In other words, images 428.1, 428.2, and 428.3 may be associated with search results of the specified search result type 526.1, 526.2, and 526.3, respectively.

Figure 6:
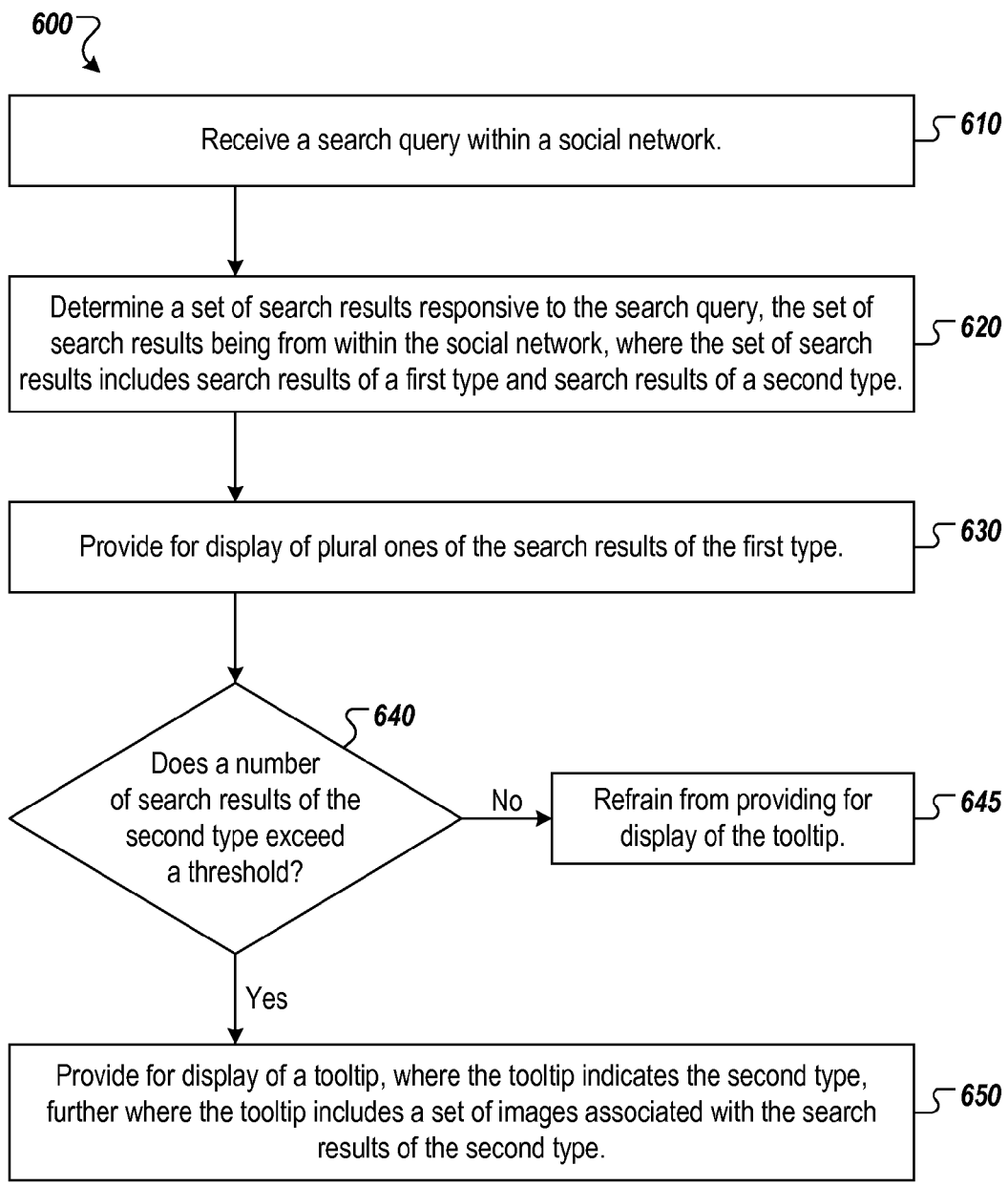
FIG. 6 illustrates an example process by which a tooltip based on search results may be provided.

FIG. 6 illustrates an example process 600 by which a tooltip (e.g., tooltip 426) based on search results (e.g., search results 526.1-4) may be provided.

The process 600 begins at step 610, where the server (e.g., server 120) receives a search query within a social network. For example, a user of a client computing device may enter a search query within an input box (e.g., search input box 416) of a web browser window and select a search button (e.g., search button 418) causing the search query to be transmitted to the server.

In step 620, the server determines a set of search results responsive to the search query. The set of search results may be from within the social network. The set of search results may include search results of a first type and search results of a second type.

The first type may include generic search results, and the second type may correspond to a sub-type of the first type. For example, the first type may include all search results and the second type may correspond to discussion rooms. Alternatively, the first type may include search results of a sub-type (e.g., member profiles) and the second type may correspond to search results not having the sub-type (e.g., search results other than member profiles). The user may provided a request for search results of the sub-type (e.g., via the search result type constraint box 420), and the server may receive the request for search results of the sub-type in conjunction with the query.

In example aspects, the first type may include posts within the social network. The second type may include one or more of: a profile of individual members of the social network, a webpage within the social network including a plurality of posts, or a text, audio, or video discussion room within the social network.

In step 630, the server provides for display (e.g., via a web browser window 400 on the client computing device 130) of plural ones of search results of the first type (e.g., search results 430.1-3).

In step 640, the server determines whether a number of search results of the second type exceeds a threshold number of search results (e.g., two search results). If so, the process 600 continues to step 650. If not, the process 600 continues to step 645.

In step 645, if the number of search results of the second type does not exceed the threshold number of search results, the server refrains from providing for display of a tooltip. After step 645, the process 600 ends.

In step 650, if the number of search results of the second type exceeds the threshold number of search results, the server provides for display of a tooltip (e.g., tooltip 426). The tooltip may indicate the second type. The tooltip may include a set of images (e.g., images 428.1-3). The images may be associated with the search results of the second type. In example aspects, each image within the set of images may be associated with a corresponding search result of the second type. The set of images may include at least a number of images equal to the threshold number of search results (e.g., two images if the threshold number of search results is two search results). Thus, the threshold number of search results may be determined based on the size of the tooltip. For example, if the tooltip is smaller on a personal digital assistant (PDA) than on a laptop computer, then the threshold number of search results for the PDA may be less than that for the laptop computer.

In one example, the user may select the tooltip, and the server may receive the selection of the tooltip. The server may provide for display of a first number (e.g., ten) of search results of the second type (e.g., search results 526.1-4) responsive to the selection of the tooltip. The first number of search results may exceed the threshold number of search results. After step 650, the process 600 ends.

Figure 7:
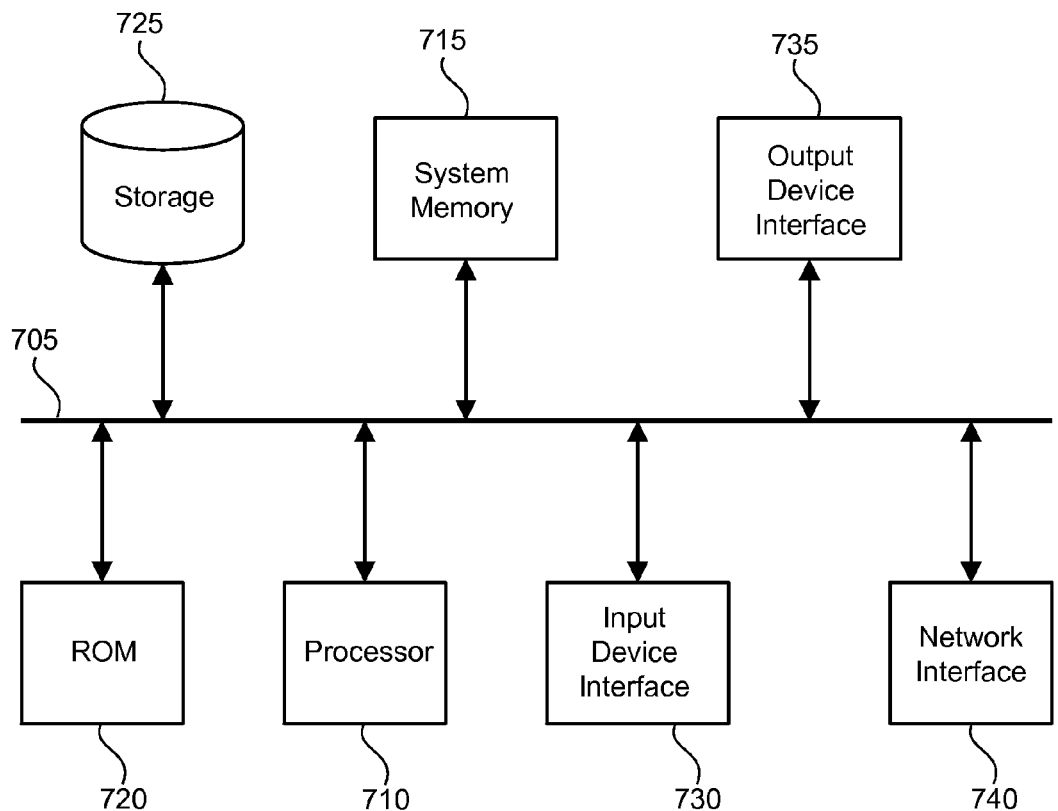
FIG. 7 conceptually illustrates an example electronic system with which some implementations of the subject technology are implemented.

FIG. 7 conceptually illustrates an electronic system 700 with which some implementations of the subject technology are implemented. For example, one or more of the database 110, the server 120, or the client computing device 130 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for providing a tooltip based on search results in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display images generated by the electronic system 700. Output devices used with output device interface 735 include, for example, printers and display devices, for example cathode ray tubes (CRT) or liquid crystal displays (LCD). Some implementations include devices for example a touchscreen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
   receiving a search query within a social network;
   determining a set of search results responsive to the search query, the set of search results being from within the social network, wherein the set of search results comprises search results of a first type and search results of a second type;
   providing for display of plural ones of the search results of the first type;
   determining whether a number of search results of the second type exceeds a threshold number; and
   providing, in a case where the number of search results of the second type exceeds the threshold number, for display of a tooltip, wherein the tooltip indicates the second type.

2. The method of claim 1, further comprising:
   refraining from providing, in a case where the number of search results of the second type does not exceed the threshold number, for display of the tooltip.

3. The method of claim 1, wherein the first type comprises generic search results, and wherein the second type comprises a sub-type of the first type.

4. The method of claim 1, wherein the first type comprises search results of a sub-type, and wherein the second type comprises generic search results not having the sub-type.

5. The method of claim 4, further comprising:
   receiving a request for the search results of the sub-type in conjunction with the search query.

6. The method of claim 1, wherein the tooltip comprises a set of images, wherein each image within the set of images is associated with a corresponding search result of the second type, and wherein the set of images comprises at least a threshold number of images.

7. The method of claim 6, further comprising:
   determining the threshold number based on the size of the tooltip.

8. The method of claim 1, wherein the first type comprises posts within the social network.

9. The method of claim 1, wherein the second type comprises a profile of an individual member of the social network.

10. The method of claim 1, wherein the second type comprises a webpage within the social network comprising a plurality of posts.

11. The method of claim 1, wherein the second type comprises a discussion room within the social network.

12. The method of claim 1, further comprising:
    receiving a selection of the tooltip; and
    providing for display of a first number of search results of the second type responsive to the selection of the tooltip, wherein the first number exceeds the threshold number.

13. A computer-readable medium comprising instructions which, when executed by one or more computers, cause the one or more computers to:
    receive a search query within a social network;
    determine a set of search results responsive to the search query, the set of search results being from within the social network, wherein the set of search results comprises generic search results and non-generic search results;
    determine that a number of non-generic search results of a specified type exceeds a threshold number; and
    provide for display of a tooltip, wherein the tooltip indicates the specified type, further wherein the tooltip comprises a set of images associated with the non-generic search results of the specified type.

14. The computer-readable medium of claim 13, further comprising instructions which, when executed by one or more computers, cause the one or more computers to:
    provide for display of plural ones of the generic search results.

15. The computer-readable medium of claim 13, wherein each image within the set of images is associated with a corresponding non-generic search result having the specified type, and wherein the set of images comprises at least a threshold number of images.

16. The computer-readable medium of claim 13, further comprising instructions which, when executed by one or more computers, cause the one or more computers to:
    determine the threshold number based on the size of the tooltip.

17. The computer-readable medium of claim 13, wherein the generic search results are posts within the social network.

18. A system comprising:
    one or more processors; and
    a memory comprising instructions which, when executed by the one or more processors, cause the one or more processors to:
      receive a search query within a social network;
      determine a set of search results responsive to the search query, the set of search results being from within the social network, wherein the set of search results comprises generic search results and non-generic search results;
      provide for display of plural ones of the generic search results;
      determine that a number of non-generic search results of a specified type exceeds a threshold number; and
      provide for display of a tooltip, wherein the tooltip indicates the specified type.

19. The system of claim 18, wherein the specified type comprises a profile of an individual member of the social network or a webpage within the social network comprising a plurality of posts.

20. The system of claim 18, wherein the specified type comprises a text, audio, or video discussion room within the social network.

* * * * *